United States Patent
Pei et al.

(10) Patent No.: US 9,784,909 B2
(45) Date of Patent: Oct. 10, 2017

(54) BACKLIGHT MODULE AND DISPLAY DEVICE

(71) Applicants: BOE Technology Group Co., Ltd., Beijing (CN); BOE Optical Science and Technology Co., Ltd., Suzhou (CN)

(72) Inventors: Xiaozeng Pei, Beijing (CN); Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 209 days.

(21) Appl. No.: 14/800,747

(22) Filed: Jul. 16, 2015

(65) Prior Publication Data

US 2016/0291241 A1 Oct. 6, 2016

(30) Foreign Application Priority Data

Mar. 31, 2015 (CN) ...................... 2015 2 0189458 U

(51) Int. Cl.
*F21V 8/00* (2006.01)

(52) U.S. Cl.
CPC .......... *G02B 6/0088* (2013.01); *G02B 6/0051* (2013.01); *G02B 6/0091* (2013.01)

(58) Field of Classification Search
CPC ... G02B 6/0088; G02B 6/0051; G02B 6/0091
See application file for complete search history.

(56) References Cited

U.S. PATENT DOCUMENTS

2009/0296026 A1* 12/2009 Bae ...................... G02B 6/008
349/65
2015/0219835 A1* 8/2015 Kim .................. G02F 1/133308
362/609

* cited by examiner

*Primary Examiner* — Mary Ellen Bowman
(74) *Attorney, Agent, or Firm* — Westman, Champlin & Koehler, P.A.

(57) ABSTRACT

The present invention discloses a backlight module and a display device, so as to improve the luminous effect of the backlight module. The backlight module includes: a backboard; a seal frame and a light guide plate arranged in the backboard; and a light source assembly located between the light guide plate and the seal frame. The light source assembly comprises a light source and a circuit board for controlling the light source. A bottom surface of the circuit board of the light source assembly abuts against an inner surface of the backboard. Since the bottom surface of the circuit board abuts against the inner surface of the backboard, the heat generated by the light source of the light source assembly may be transferred to the backboard through the circuit board and directly dissipated outside from the backboard. Thereby, it may prevent the temperature of the light source and the light guide plate from becoming over high, increasing the light emitting effect of the light source and light guide plate, and improving the luminous effect of the backlight module.

16 Claims, 3 Drawing Sheets

BACKLIGHT MODULE AND DISPLAY DEVICE

CROSS-REFERENCE TO RELATED APPLICATION

This application claims the benefit of Chinese Patent Application No. CN201520189458.6 filed on Mar. 31, 2015 in the State Intellectual Property Office of China, the whole disclosure of which is incorporated herein by reference.

BACKGROUND OF THE INVENTION

Field of the Invention

The present invention relates to a display technology, more particularly relates to a backlight module and a display device comprising the backlight module.

Description of the Related Art

A liquid crystal display (LCD) has many advantages of, such as, thin body, low power consumption, low radiation, etc., thereby it has been widely used. Since a display panel itself of the liquid crystal display does not emit light, it is necessary to provide a light source with a backlight module for the display panel to display an image.

FIG. 1 is an illustrative local cross section view of a backlight module in the prior art. As shown in FIG. 1, the backlight module comprises a backboard 1, a seal frame 2 provided in the backboard 1, a reflection sheet 3 provided on a bottom surface of the backboard 1, a light guide plate 4 provided on the reflection sheet 3, a diffusion sheet 6 provided on an upper surface of the light guide plate 4, a prism sheet 7 provided on an upper surface of the diffusion sheet 6, a light source assembly 5 provided between the light guide plate 4 and the seal frame 2, and a shading tape 8 attached on a circuit board 51 of the light source assembly 5. Both ends of the shading tape 8 are attached on the prism sheet 7 and the seal frame 2, respectively. A light emitted from a light source 52 of the light source assembly 5 passes through the light guide plate 4, the diffusion sheet 6 and the prism sheet 7 and is output from an upper surface of the prism sheet 7 to form a surface light.

After a large number of studies, inventors of the present application find that, if using the above backlight module, it is difficult to dissipate outside the heat generated by the light source 52. As a result, it increases the temperature of optical films adjacent to the light source 52 in the backlight module and decreases the luminous effect of the backlight module.

SUMMARY OF THE INVENTION

The present invention has been made to overcome or alleviate at least one aspect of the above mentioned disadvantages.

According to an object of the present invention, there is provided a backlight module and a display device comprising the backlight module, so as to improve the luminous effect of the backlight module.

According to an aspect of the present invention, there is provided a backlight module comprising: a backboard; a seal frame and a light guide plate arranged in the backboard; and a light source assembly located between the light guide plate and the seal frame. The light source assembly comprises a light source and a circuit board for controlling the light source. A bottom surface of the circuit board of the light source assembly abuts against an inner surface of the backboard.

According to another aspect of the present invention, there is provided a display device comprising the above backlight module.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
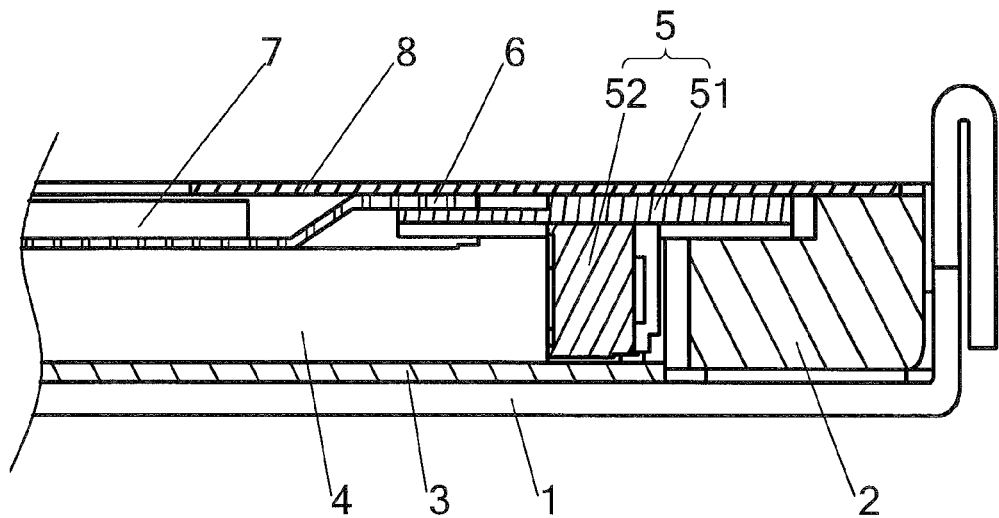
FIG. 1 is an illustrative local cross section view of a backlight module in the prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a backlight module comprising: a backboard; a seal frame and a light guide plate arranged in the backboard; and a light source assembly located between the light guide plate and the seal frame. The light source assembly comprises a light source and a circuit board for controlling the light source. A bottom surface of the circuit board of the light source assembly abuts against an inner surface of the backboard.

Figure 2:
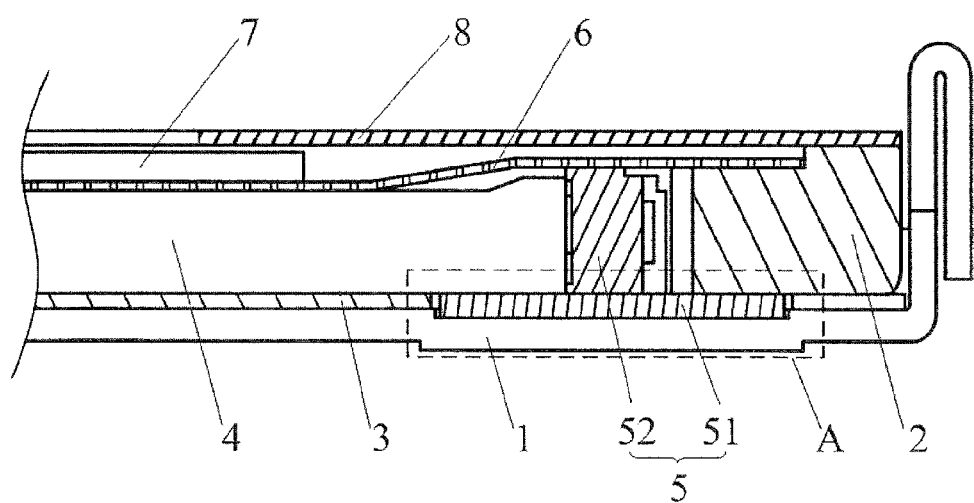
FIG. 2 is an illustrative local cross section view of a backlight module according to a first exemplary embodiment of the present invention.
Figure 3:
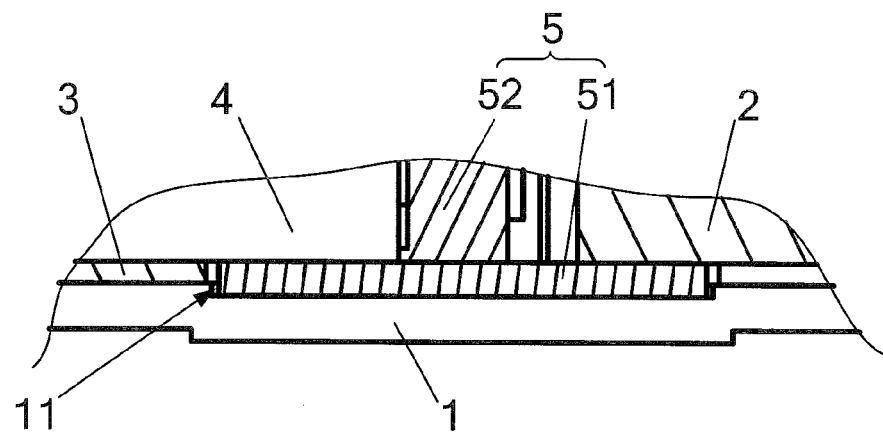
FIG. 3 is an enlarged view of a portion in FIG. 2 indicated by A.
Figure 4:
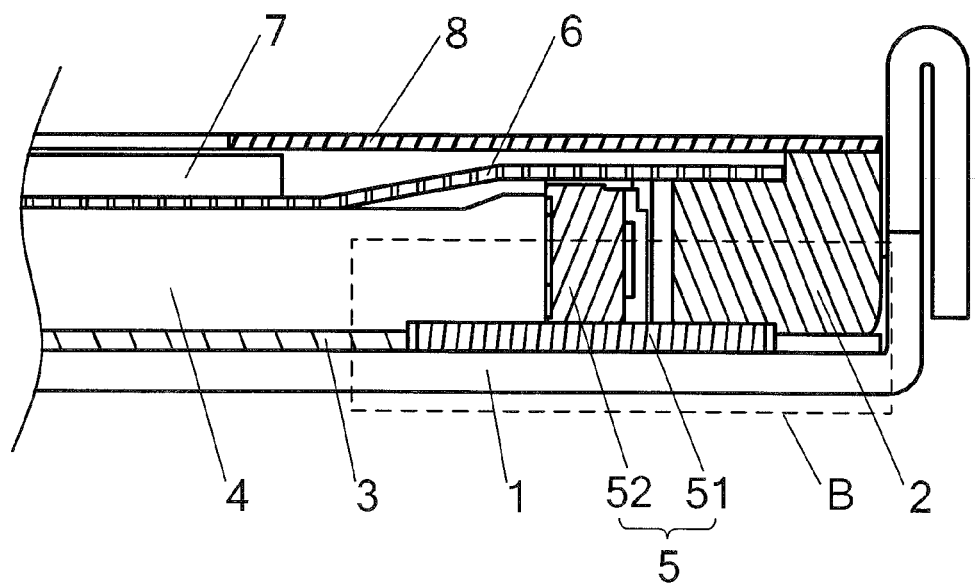
FIG. 4 is an illustrative local cross section view of a backlight module according to a second exemplary embodiment of the present invention.

As shown in FIG. 2 or FIG. 4, in an exemplary embodiment of the present invention, the backlight module comprises a backboard 1, a seal frame 2, a light guide plate 4 and a light source assembly 5. The light guide plate 4 is located above an inner surface of the backboard 1. The seal frame 2 is located in the backboard around the light guide plate 4. The light source assembly 5 is located between the light guide plate 4 and the seal frame 2 and comprises a light source 52 and a circuit board 51 for controlling the light source 52 to emit light. In an exemplary embodiment, the light source 52 is configured to be a luminous strip referred as a lamp strip. A bottom surface (a lower surface shown in FIGS. 2 and 3) of the circuit board 51 of the light source assembly 5 abuts against the inner surface (an upper surface shown in FIGS. 2 and 3) of the backboard 1.

In the backlight module according to the embodiment of the present invention, since the bottom surface of the circuit board 51 of the light source assembly 5 abuts against the inner surface of the backboard 1, heat generated by the light source 52 of the light source assembly 5, when the backlight module is in operation, may be transferred to the backboard 1 through the circuit board 51 and dissipated outside from the backboard 1. Thereby, the heat generated by the light source 52 may be dissipated outside the backlight module in time, and it is possible to prevent the temperature of the light source 52 and the light guide plate 4 from becoming over high, the light emitting efficiency of the light source 52 from being decreased and the lighting effect of the light guide plate 4 from becoming poor. In this way, it improves the luminous effect of the backlight module. Furthermore, since the heat generated by the light source 52 may be dissipated outside the backlight module in time when the backlight module is in operation, it is possible to prevent the light source 52 and the light guide plate 4 from being kept at high temperature in long time, slowing the aging speed of the light source 52 and the light guide plate 4, and prolonging the service life of the light source 52 and the light guide plate 4. Moreover, during assembling the backlight module according to the embodiment of the present invention, a shading tape 8 is attached above the light source assembly 5, it may avoid touching the light source assembly 5 when pressing the shading tape 8, and prevent the light source assembly 5 from being warped. In this way, it may keep the light emitted from the light source 52 in uniform, and effectively improve the luminous effect of the backlight module.

For example, as it is appreciated for those skilled in this art, during assembling the backlight module, it is inevitable to press some members in the backlight module. Since the bottom surface of the circuit board 51 abuts against the inner surface of the backboard 1, the backboard 1 is served as a support member for supporting the light source assembly 5. Thereby, it may prevent the circuit board 51 from being deformed by pressing some members in the backlight module during assembling backlight module. In this way, the light source assembly 5 may not be bent or floated, preventing the light source 52 from being shifted relative to the side surface of the light guide plate 4, avoiding the light from being leaked and reduced in amount, and improving the luminous effect of backlight module.

In the above embodiments, referring to FIG. 2 or 4 again, a top surface of the circuit board 51 abuts against a surface of the light guide plate 4 facing the inner surface of the backboard 1. Specifically, the circuit board 51 is provided between the light guide plate 4 and the inner surface of the backboard 1, and the bottom surface of the circuit board 51 abuts against the inner surface of the backboard 1, the top surface of the circuit board 51 abuts against a surface of the light guide plate 4 facing the inner surface of the backboard 1. With such design, the circuit board 51 does not shade the light output surface of the light guide plate 4, thereby, it increases the effective light output area of the light output surface of the light guide plate 4 and increases the visual area of the backlight module, which makes the backlight module according to the embodiments of the present invention is suitable for producing a display device with a narrow frame.

In the backlight module according to the embodiments of the present invention, please refer to FIG. 2 or 4 again, the backlight module further comprises a reflection sheet 3 located between the light guide plate 4 and the inner surface of the backboard 1. Generally, the reflection sheet 3 is very thin. For compensation for a thickness difference between the circuit board 51 and the reflection sheet 3 located between the light guide plate 4 and the inner surface of the backboard 1, and for eliminating a large gap between the reflection sheet 3 and the light guide plate 4, the following arrangement manners according to two embodiments may be adopted.

In a first exemplary embodiment, as shown in FIGS. 2 and 3, a groove 11 is formed in the inner surface of the backboard 1, and a portion of the circuit board 51 in the thickness direction thereof is located in the groove 11. In an embodiment, the groove 11 is formed in a region where the inner surface of the backboard 1 abuts against the circuit board 51, the portion of the circuit board 51 in the thickness direction thereof is located in the groove 11 and abuts against the bottom surface of the groove 11. With such configuration, it may compensate for the thickness difference between the reflection sheet 3 and the circuit board 51, and make the top surface of the circuit board 51 to flush with the top surface of the reflection sheet 3 far away from the backboard 1. In this way, it may prevent a large gap from being occurred between the reflection sheet 3 and the light guide plate 4 due to the thickness of the circuit board 51 is larger than that of the reflection sheet 3, avoid the light leakage, and improve the luminous effect of backlight module. Please be noted that a protrusion is formed on a location, corresponding to the groove 11, on the outer surface of the backboard 1. Thereby, it prevent the thickness of the backboard 1 from being changed due to the groove 11 provided in the inner bottom surface of the backboard 1, and ensure the overall strength of the backboard 1.

Figure 5:
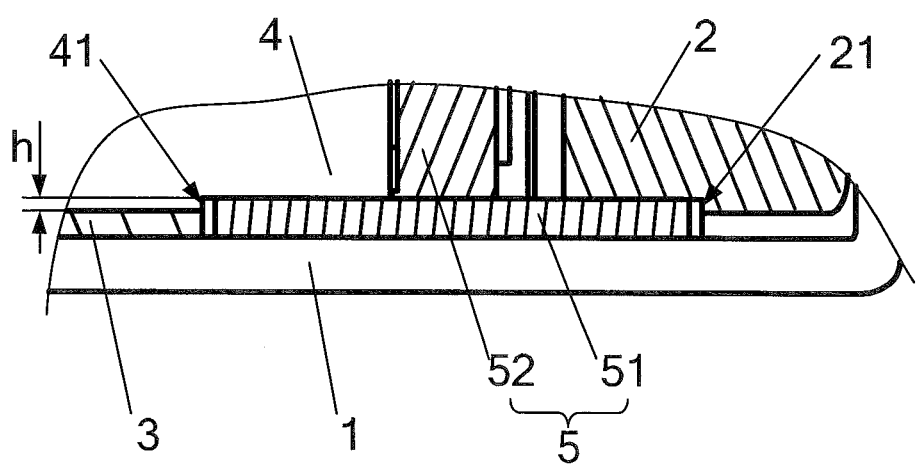
FIG. 5 is an enlarged view of a portion in FIG. 4 indicated by B.

In the second exemplary embodiment, as shown in FIGS. 4 and 5, a step-shaped groove 41 is provided in a surface of the light guide plate 4 facing the inner surface of the backboard 1. The top surface of the circuit board 51 abuts against the bottom surface of the step-shaped groove 41. In an embodiment, the step-shaped groove 41 is provided in a location of the light guide plate 4 facing the inner surface of the backboard 1 and abutting against the top surface of the circuit board 51. The width of the step-shaped groove 41 corresponds to the width of a portion of the top surface of the circuit board 51 abutting against the bottom surface of the light guide plate 4 facing the backboard 1. With this configuration, it may compensate for the thickness difference between the reflection sheet 3 and the circuit board 51, align the light source 52 to the side surface of the light guide plate 4, and prevent the light source 52 from being shifted relative to the side surface of the light guide plate 4, avoid the light from being leaked and reduced in amount, and improve the luminous effect of backlight module.

In the second exemplary embodiment, as shown in FIG. 5, the step-shaped groove is configured to have a depth h of 0.03 mm~0.07 mm in a direction perpendicular to the inner surface of the backboard 1. In a condition where the thickness difference between the reflection sheet 3 and the circuit board 51 is compensated, if the depth h of the step-shaped groove is set within 0.03 mm~0.07 mm in the direction perpendicular to the inner surface of the backboard 1, it may prevent the optical performance of the light guide plate from being decreased due to the depth h of the step-shaped groove is too large, improving the luminous effect of backlight module.

In another embodiment, a receiving groove 11 is formed in a surface of the seal frame 2 facing the inner surface of the backboard 1. The top surface of the circuit board 51 abuts against the bottom surface of the receiving groove 11. That is, the seal frame 2 may be formed with a step-shaped groove like the light guide plate 4, so as to facilitate the assembling of the circuit board 51.

As it is appreciated for those skilled in this art, the first exemplary embodiment and the second exemplary embodiment may be combined with each other. For example, in a third exemplary embodiment, the backboard 1 is provided with the groove, and the light guide plate 4 and the seal frame 2 both may be provided with the step-shaped groove.

Please refer to FIGS. 2-5 again, in the backlight module in the embodiments of the present invention, the top surface of the circuit board 51 abuts against a surface of the seal frame 2 facing the inner surface of the backboard 1. For example, as shown FIGS. 2 and 3, the surface of the seal frame 2 facing the inner surface of the backboard 1 abuts against the top surface of the circuit board 51. As shown in FIGS. 4 and 5, a step-shaped groove 21 is provided in the surface of the seal frame 2 facing the inner surface of the backboard 1, the bottom surface of the step-shaped groove 21 abuts against the top surface of the circuit board 51. With such configuration, it may prevent the light source assembly 5 from being bent or floated after the circuit board 51 abuts against the inner surface of the backboard 1 and the surface of the light guide plate 4 facing the inner surface of the backboard 1, respectively, avoid the light source 52 from being shifted relative to the side surface of the light guide plate 4, and improve the luminous effect of backlight module.

Please refer to FIG. 2 or 4 again, the backlight module in the above embodiments may further comprise a diffusion sheet 6 provided on a light output surface of the light guide plate 4. A light input surface of the diffusion sheet 6 is lapped with a surface of the seal frame 2 far away from the inner surface of the backboard 1, that is, the light input surface of the diffusion sheet 6 extends onto the seal frame 2. With such configuration, during assembling the backlight module, the diffusion sheet 6 may be directly mounted on the light output surface of the light guide plate 4, and the light input surface of the diffusion sheet 6 may be lapped with the surface of the seal frame 2 far away from the inner surface of the backboard 1. In this way, the light source 52 is shaded by the diffusion sheet 6, increasing the utilization efficiency of the light emitted from the light source 52, reducing the leakage of the light, and further improving the luminous effect of the backlight module. Furthermore, after the circuit board 51 is provided between the light guide plate 4 and the bottom surface of the backboard 1, it may prevent the numbers and time of aligning the diffusion sheet 6 during assembling the diffusion sheet 6 from being increased due to the periphery of the diffusion sheet 6 is in a floating state, saving the assembling time of the backlight module.

According to another embodiment of the present invention, there is also disclosed a display device comprising the above backlight module according to the above various embodiments. Thereby, the display device has the effects like the above backlight module, and description in detail thereof is omitted herein.

In the backlight module and the display device according to embodiments of the present invention, the bottom surface of the circuit board of the light source assembly tightly abuts against the inner surface of the backboard, the heat generated by the light source of the light source assembly, when the backlight module is in operation, may be transferred to the backboard through the circuit board and directly dissipated outside from the backboard. Thereby, the heat generated by the light source may be dissipated outside the backlight module in time, and it may prevent the temperature of the light source and the light guide plate from becoming over high. Thereby, it increases the light emitting effect of the light source and light guide plate, and improves the luminous effect of the backlight module. Furthermore, it may prevent optical films adjacent to the light source in the backlight module from being kept at high temperature in long time. Thereby, it prolongs the service life of the light source and the optical films, for example, the light guide plate.

Please be noted that the above display device may be any product or member with display function, such as, liquid crystal display device, electronic paper, mobile phone, panel computer, TV, notebook computer, digital photo frame, navigator, etc.

It should be appreciated for those skilled in this art that the above embodiments are intended to be illustrated, and not restrictive. For example, many modifications may made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A backlight module, comprising:
   a backboard;
   a seal frame and a light guide plate arranged in the backboard, a positioning recess being formed in a surface of the seal frame far away from an inner surface of the backboard;
   a light source assembly located between the light guide plate and the seal frame, the light source assembly comprising a light source and a circuit board for controlling the light source; and
   a diffusion sheet provided on a light output surface of the light guide plate, a light input surface of the diffusion sheet being lapped with the surface of the seal frame far away from the inner surface of the backboard, and a periphery of the diffusion sheet being located in the positioning recess,
   wherein a bottom surface of the circuit board of the light source assembly abuts against the inner surface of the backboard.

2. The backlight module according to claim 1,
   wherein a top surface of the circuit board abuts against a surface of the light guide plate facing the inner surface of the backboard.

3. The backlight module according to claim 2,
   wherein a groove is formed in the inner surface of the backboard, and at least a portion of the circuit board is located in the groove.

4. The backlight module according to claim 3,
wherein a step-shaped groove is formed in the surface of the light guide plate facing the inner surface of the backboard, and a portion of the top surface of the circuit board abuts against a bottom surface of the step-shaped groove.

5. The backlight module according to claim 2,
wherein a step-shaped groove is formed in the surface of the light guide plate facing the inner surface of the backboard, and a portion of the top surface of the circuit board abuts against a bottom surface of the step-shaped groove.

6. The backlight module according to claim 5,
wherein the step-shaped groove is configured to have a depth of 0.03 mm~0.07 mm in a direction perpendicular to the inner surface of the backboard.

7. The backlight module according to claim 1,
wherein a portion of a top surface of the circuit board abuts against a surface of the seal frame facing the inner surface of the backboard.

8. The backlight module according to claim 7,
wherein a receiving groove is formed in the surface of the seal frame facing the inner surface of the backboard, and the portion of the top surface of the circuit board abuts against a bottom surface of the receiving groove.

9. A display device comprising the backlight module according to claim 1.

10. The display device according to claim 9,
wherein a top surface of the circuit board abuts against a surface of the light guide plate facing the inner surface of the backboard.

11. The display device according to claim 10,
wherein a groove is formed in the inner surface of the backboard, and at least a portion of the circuit board is located in the groove.

12. The display device according to claim 11,
wherein a step-shaped groove is formed in the surface of the light guide plate facing the inner surface of the backboard, and a portion of the top surface of the circuit board abuts against a bottom surface of the step-shaped groove.

13. The display device according to claim 10,
wherein a step-shaped groove is formed in the surface of the light guide plate facing the inner surface of the backboard, and a portion of the top surface of the circuit board abuts against a bottom surface of the step-shaped groove.

14. The display device according to claim 13,
wherein the step-shaped groove is configured to have a depth of 0.03 mm~0.07 mm in a direction perpendicular to the inner surface of the backboard.

15. The display device according to claim 9,
wherein a portion of a top surface of the circuit board abuts against a surface of the seal frame facing the inner surface of the backboard.

16. The display device according to claim 15,
wherein a receiving groove is formed in the surface of the seal frame facing the inner surface of the backboard, and the portion of the top surface of the circuit board abuts against a bottom surface of the receiving groove.

\* \* \* \* \*